(12) United States Patent
Maruyama

(10) Patent No.: US 9,748,994 B2
(45) Date of Patent: Aug. 29, 2017

(54) COMMUNICATION MODULE

(71) Applicant: ALPS ELECTRIC CO., LTD., Tokyo (JP)

(72) Inventor: Takashi Maruyama, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/404,715

(22) Filed: Jan. 12, 2017

(65) Prior Publication Data

US 2017/0214424 A1    Jul. 27, 2017

(30) Foreign Application Priority Data

Jan. 22, 2016 (JP) ................................ 2016-010954

(51) Int. Cl.
| | | |
|---|---|---|
| H04M 1/00 | (2006.01) | |
| H04B 1/3827 | (2015.01) | |
| H04B 1/40 | (2015.01) | |
| H04W 88/06 | (2009.01) | |
| H04W 84/12 | (2009.01) | |
| H04W 4/00 | (2009.01) | |

(52) U.S. Cl.
CPC ............. *H04B 1/3827* (2013.01); *H04B 1/40* (2013.01); *H04W 4/008* (2013.01); *H04W 84/12* (2013.01); *H04W 88/06* (2013.01)

(58) Field of Classification Search
CPC ........ H04B 1/0057; H04B 1/006; H04B 1/48; H04B 1/0064; H04B 1/16; H04B 1/40; H04B 1/44; H04B 1/525; H04B 15/06; H04B 17/19; H04B 17/20; H04B 1/0475; H04B 1/1036; H04B 1/30; H04B 1/3805; H04B 1/50; H04B 2001/1063; H04B 5/0031
USPC ....................................................... 455/550.1
See application file for complete search history.

(56) References Cited

U.S. PATENT DOCUMENTS

| | | | | |
|---|---|---|---|---|
| 8,183,957 | B2 * | 5/2012 | Sasaki | H04B 1/0057 333/126 |
| 8,660,043 | B2 * | 2/2014 | Kim, II | H04B 1/0057 370/277 |
| 9,602,147 | B2 * | 3/2017 | Uejima | H04B 1/006 |
| 2009/0206948 | A1 * | 8/2009 | Kemmochi | H04B 1/0057 333/126 |

FOREIGN PATENT DOCUMENTS

JP    2010-16732 A    1/2010

* cited by examiner

*Primary Examiner* — Ajibola Akinyemi
(74) *Attorney, Agent, or Firm* — Brinks Gilson & Lione

(57) ABSTRACT

A second-signal first transmission line operates as an open stub in a state in which a second antenna terminal is open. Therefore, a first signal is attenuated that is transmitted from a branch point between a second-signal first transmission line and a second-signal second transmission line to a second communication unit through a second common transmission line. In a case in which a two-antenna communication module performs communication of the first signal and communication of a second signal at the same time by connecting a shared antenna to a first antenna terminal.

8 Claims, 8 Drawing Sheets

COMMUNICATION MODULE

CLAIM OF PRIORITY

This application claims benefit of priority to Japanese Patent Application No. 2016-010954 filed on Jan. 22, 2016, which is hereby incorporated by reference in its entirety.

BACKGROUND

1. Field of the Disclosure

The present disclosure relates to a communication module capable of concurrently performing wireless communications in which different frequency bands are used.

2. Description of the Related Art

Mobile devices that have been widely used in recent years have communication functions based on various communication methods such as in wireless local area network (LAN) communication and Bluetooth (registered trademark) communication. Japanese Unexamined Patent Application Publication No. 2010-16732 describes a wireless communication device capable of performing 2.4-GHz communications over a wireless LAN and a Bluetooth (registered trademark) network at the same time. With this wireless communication device, a single antenna is shared by two communication methods, so the number of parts is smaller than when an independent antenna is used for each of the two communication methods.

Besides the 2.4-GHz band, the 5-GHz band can be used on wireless LANs. Recent mobile devices are becoming ready not only for a 2.4-GHz wireless LAN and Bluetooth (registered trademark) network but also for a relatively high-speed wireless LAN in the 5-GHz band.

When one device performs wireless communications in different frequency bands, an antenna is usually used for each frequency band. To reduce the number of parts, however, it is desirable to share a single antenna between wireless communications in two frequency bands as in the wireless communication device described in Japanese Unexamined Patent Application Publication No. 2010-16732.

Part of the frequency band used by a 5-GHz wireless LAN overlaps frequency bands used by weather radars and the like. To prevent effects on the operations of these radars, there is an obligation to use a frequency switching function called dynamic frequency selection (DFS). DFS monitors whether there is a radar radio wave when a frequency channel starts to be used or while it is being used. If a radar radio wave is detected, transmission of radio waves at the frequency channel is prohibited and the frequency channel is switched to. On a 5-GHz wireless LAN, therefore, DFS regularly performs a reception operation for radar radio wave monitoring. If this reception operation by DFS is performed by using the same antenna as used in 2.4-GHz wireless LAN communication or Bluetooth (registered trademark) communication, a 2.4-GHz transmission signal may enter a 5-GHz reception circuit, which may prevent a normal reception operation. If, for example, a large signal in the 2.4-GHz band enters a 5-GHz reception circuit, the signal level is saturated in a circuit element in an amplifier at the first stage, in which case, even if filtering or other processing is performed in a circuit at a later stage, a normal 5-GHz reception signal cannot be obtained. To avoid this problem, when the same antenna is used to perform 2.4-GHz wireless communication (wireless LAN communication or Bluetooth communication) and 5-GHz wireless communication (wireless LAN communication) at the same time, it is necessary to provide a filter that attenuates the 2.4-GHz signal transmitted from the antenna to a 5-GHz communication circuit.

However, it is not determined whether a device that performs 2.4-GHz wireless communication (wireless LAN communication or Bluetooth communication) and 5-GHz wireless communication (wireless LAN communication) at the same time uses a shared antenna or independent antennas. Therefore, communication modules are preferably structured so as to be easily applicable to both types of devices.

SUMMARY

A communication module according to a first aspect of the present disclosure is capable of concurrently performing wireless communication of a first signal and wireless communication of a second signal, the first signal and second signal being in different frequency bands. The communication module has: a wiring board that includes a first antenna terminal connectable to a first-signal antenna used in communication of the first signal or to a shared antenna used in both communication of the first signal and communication of the second signal, and also includes a second antenna terminal connectable to a second-signal antenna used in communication of the second signal. A first communication unit is disposed on the wiring board, the first communication unit transmitting the first signal. A second communication unit is disposed on the wiring board, the second communication unit receiving the second signal. The wiring board includes: a first-signal transmission line disposed in a path that interconnects the first antenna terminal and the first communication unit. The first signal is transmitted through the first signal transmission line. A second-signal first transmission line is disposed in a path that interconnects the second antenna terminal and the second communication unit. The second signal is capable of being transmitted through the second-signal first transmission line in a state in which the second-signal antenna is connected to the second antenna terminal. A second-signal second transmission line is disposed in a path that interconnects the first antenna terminal and the second communication unit, the second signal being transmitted through the second-signal second transmission line. A first common transmission line is provided so as to be shared between a path that interconnects the first antenna terminal and the first-signal transmission line and a path that interconnects the first antenna terminal and the second-signal second transmission line. A second common transmission line is provided so as to be shared between a path that interconnects the second-signal first transmission line and the second communication unit and a path that interconnects the second-signal second transmission line and the second communication unit. The second-signal first transmission line functions as an open stub that attenuates the first signal transmitted from a branch point between the second-signal first transmission line and the second-signal second transmission line to the second communication unit through the second common transmission line in a state in which the second antenna terminal is open.

In the structure described above, since the second-signal first transmission line operates as an open stub in a state in which the second antenna terminal is open, the first signal is attenuated that is transmitted from the branch point between the second-signal first transmission line and the second-signal second transmission line to the second communication unit through the second common transmission line. Therefore, when wireless communication of the first signal and wireless communication of the second signal are performed at the same time by connecting the shared antenna to the first antenna terminal, it is possible to omit a band pass filter and other elements that would otherwise be used to attenuate the first signal transmitted from the second-signal second transmission line to the second communication unit.

When the second-signal antenna is connected to the second antenna terminal, the second-signal first transmission line doubles as a transmission line used for signal transmission between the branch point and the second antenna terminal. Therefore, the wiring board can be diverted to a communication module structured so that wireless communication of the first signal and wireless communication of the second signal can be performed at the same time by connecting the first-signal antenna to the first antenna terminal and connecting the second-signal antenna to the second antenna terminal. This enables parts to be shared and costs can be suppressed.

A communication module according to a second aspect of the present disclosure is capable of concurrently performing wireless communication of a first signal and wireless communication of a second signal. The first signal and second signal are in different frequency bands. The communication module has: a wiring board that includes a first antenna terminal connectable to a first-signal antenna used in communication of the first signal or to a shared antenna used in both communication of the first signal and communication of the second signal, and also includes a second antenna terminal connectable to a second-signal antenna used in communication of the second signal. A first communication unit is disposed on the wiring board, the first communication unit transmitting the first signal. A second communication unit is disposed on the wiring board, the second communication unit receiving the second signal. The wiring board includes: a first-signal transmission line disposed in a path that interconnects the first antenna terminal and the first communication unit. The first signal is transmitted through the first signal transmission line. A second-signal first transmission line is disposed in a path that interconnects the second antenna terminal and the second communication unit. The second signal is transmitted through the second-signal first transmission line. A second-signal second transmission line is disposed in a path that interconnects the first antenna terminal and the second communication unit. The second signal is capable of being transmitted through the second-signal second transmission line in a state in which the shared antenna is connected to the first antenna terminal. A first common transmission line is provided so as to be shared between a path that interconnects the first antenna terminal and the first-signal transmission line and a path that interconnects the first antenna terminal and the second-signal second transmission line. A second common transmission line is provided so as to be shared between a path that interconnects the second-signal first transmission line and the second communication unit and a path that interconnects the second-signal second transmission line and the second communication unit. The second-signal second transmission line functions as an open stub that attenuates the first signal transmitted from a branch point between the second-signal first transmission line and the second-signal second transmission line to the second communication unit through the second common transmission line in a state in which the second-signal second transmission line is separated from the first common transmission line and first-signal transmission line.

In the structure described above, since the second-signal second transmission line functions as an open stub in a state in which the second-signal second transmission line is separated from the first common transmission line and first-signal transmission line, the first signal is attenuated that is transmitted from the branch point between the second-signal first transmission line and the second-signal second transmission line to the second communication unit through the second common transmission line. Therefore, when wireless communication of the first signal and wireless communication of the second signal are performed at the same time by connecting the first-signal antenna to the first antenna terminal and connecting the second-signal antenna to the second antenna terminal, the first signal is attenuated that is transmitted from the first antenna terminal to the second communication unit through the second-signal first transmission line.

When the shared antenna terminal is connected to the first antenna terminal, the second-signal second transmission line doubles as a transmission line used for signal transmission between the branch point and the first antenna terminal. Therefore, the wiring board can be diverted to a communication module structured so that wireless communication of the first signal and wireless communication of the second signal can be performed at the same time by connecting the shared antenna to the first antenna terminal. This enables parts to be shared and costs can be suppressed.

DESCRIPTION OF THE EXEMPLARY EMBODIMENTS

First Embodiment

Communication modules in a first embodiment of the present invention will be described below with reference to the drawings. The communication modules in this embodiment include a circuit module incorporated into various electronic devices having wireless communication functions. These communication modules can concurrently perform wireless communications in which two different frequency bands are used. The communication modules, described below as an example, can perform wireless communication over a 2.4-GHz wireless LAN or Bluetooth (registered trademark) network and wireless communication over a 5-GHz wireless LAN at the same time. However, these frequency bands and communication methods in wireless communication are not limitations.

The communication modules in this embodiment are two types of communication modules. One type of communication module uses independent antennas in wireless communications in two frequency bands (this type of communication module will sometimes be referred to below as the two-antenna communication module). The other type of communication module uses a common antenna in wireless communications in two frequency bands (this type of communication module will sometimes be referred to below as the one-antenna communication module). A wiring board 1 can be used in these two types of communication modules in this embodiment in common without having to be largely modified, as described below.

Figure 1:
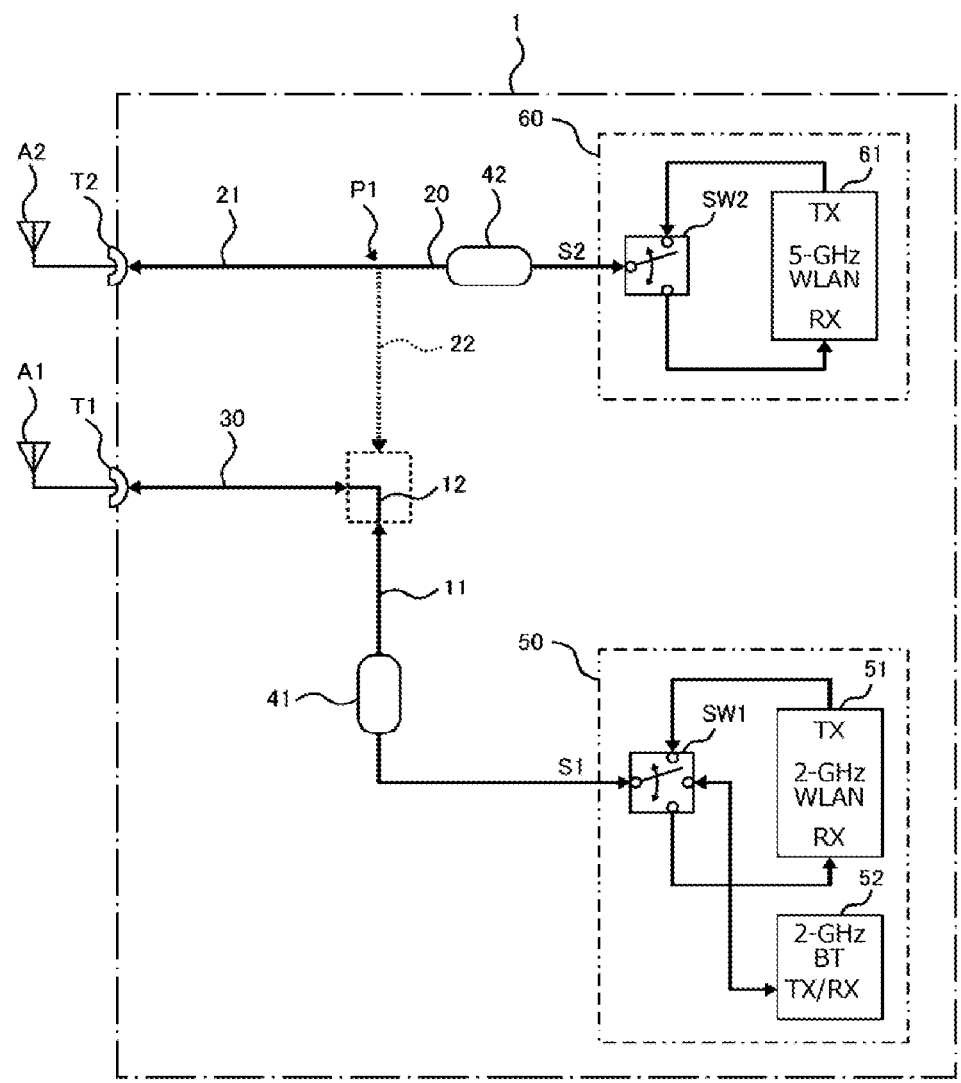
FIG. 1 illustrates an example of the structure of a communication module in a first embodiment, in which independent antennas are used in wireless communications in two frequency bands.
Figure 2:
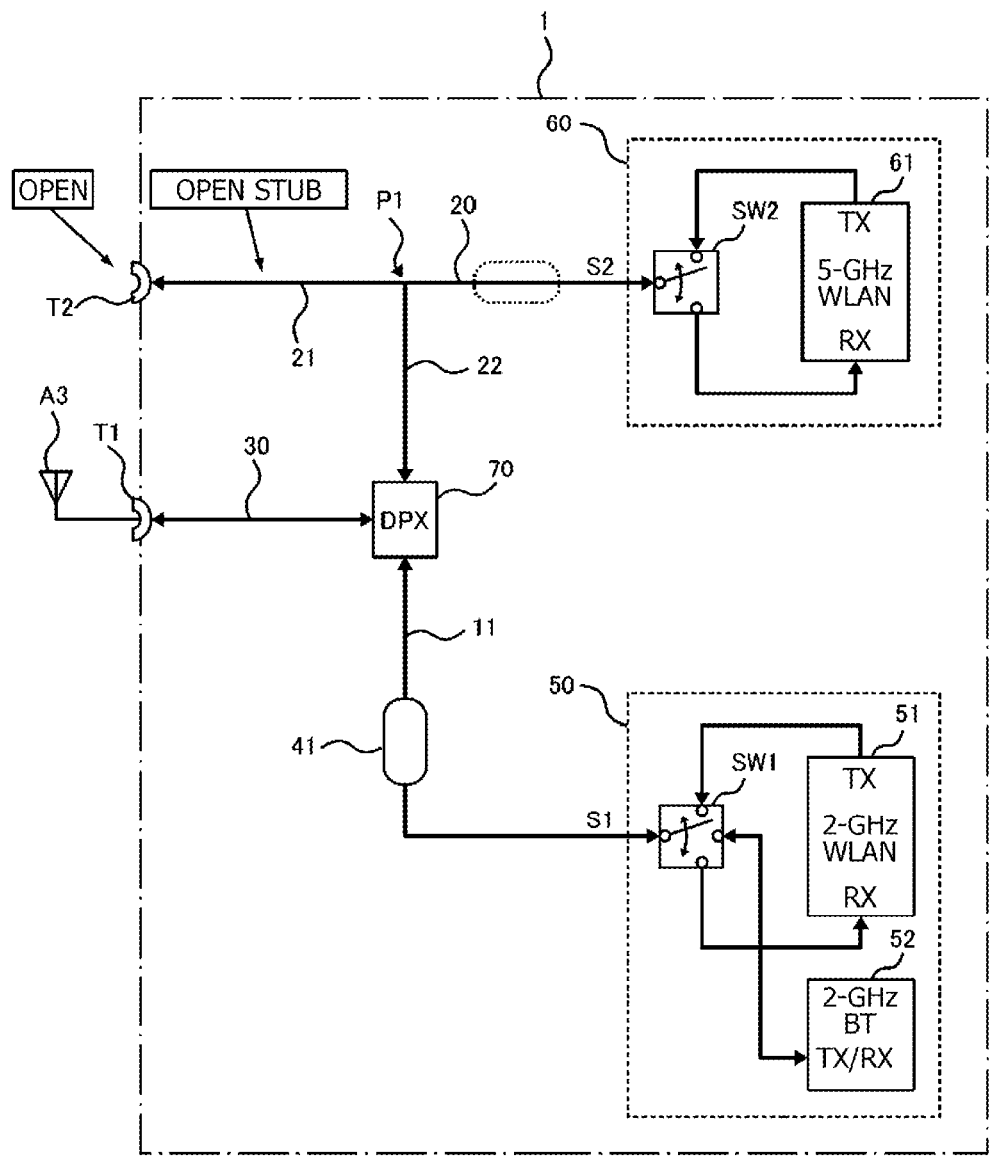
FIG. 2 illustrates an example of the structure of another communication module in the first embodiment, in which a common antenna is used in wireless communications in two frequency bands.

FIGS. 1 and 2 illustrate examples of the structures of the communication modules in the first embodiment. Specifically, FIG. 1 illustrates an example of the two-antenna communication module, which uses independent antennas in wireless communications in two frequency bands, and FIG. 2 illustrates an example of the one-antenna communication module, which uses a common antenna in wireless communications in two frequency bands. The communication modules in this embodiment each have the wiring board 1, a first communication unit 50, a second communication unit 60, and a first band pass filter 41 as constituent elements common to these two types of communication modules (two-antenna communication module and one-antenna communication module).

The first communication unit 50 is a circuit that transmits and receives a 2.4-GHz signal (which will sometimes be referred to below as the first signal S1). The first communication unit 50 is mounted on the wiring board 1. In the examples in FIGS. 1 and 2, the first communication unit 50 has a communication circuit 51, a communication circuit 52, and a switch SW1. The communication circuit 51 processes signals involved in 2.4-GHz wireless LAN communication. The communication circuit 52 processes signals involved in 2.4-GHz Bluetooth (registered trademark) communication. The switch SW1 selects the output terminal of the communication circuit 51 from which a transmission signal is output, the input terminal of the communication circuit 51 at which a reception signal is received, or an input/output terminal of the communication circuit 52 from which a transmission signal is output and at which a reception signal is received, after which the switch SW1 connects the selected terminal to a first-signal transmission line 11, which will be described below.

The second communication unit 60 is a circuit that transmits and receives a 5-GHz signal (which will sometimes be referred to below as the second signal S2). The second communication unit 60 is mounted on the wiring board 1. In the examples in FIGS. 1 and 2, the second communication unit 60 has a communication circuit 61 and a switch SW2. The communication circuit 61 processes signals involved in 5-GHz wireless LAN communication. The switch SW2 selects the output terminal of the communication circuit 61 from which a transmission signal is output or the input terminal of the communication circuit 61 at which a reception signal is received, after which the switch SW2 connects the selected terminal to a second common transmission line 20, which will be described below.

Under control by a high-level apparatus (not illustrated) such as a host central processing unit (CPU), the circuits, described above, in the first communication unit 50 and second communication unit 60 perform transmission processing (coding, modulation, amplification, and the like) and reception processing (amplification, demodulation, decoding, and the like) applicable to the relevant communication method.

The wiring board 1 has a first antenna terminal T1 and a second antenna terminal T2, each of which can be connected to an antenna used in wireless communication. The first antenna terminal T1 can be connected to a first-signal antenna A1 used in communication of the first signal S1 or to a shared antenna A3 used in communication of the first signal S1 and communication of the second signal S2. The second antenna terminal T2 can be connected to a second-signal antenna A2 used in communication of the second signal S2.

The first antenna terminal T1 and second antenna terminal T2 are preferably structured by, for example, including an electrode (side-through electrode) provided at an end of the wiring board 1.

The wiring board 1 has transmission lines (11, 20 to 22, and 30) used to transmit signals (first signal S1 and second signal S2) between the communication units (first communication unit 50 and second communication unit 60) and the antenna terminals (first antenna terminal T1 and second antenna terminal T2). These transmission lines are structured by using microstrip lines in which a grand plane and a conductive pattern are oppositely disposed with a dielectric insulating layer intervening therebetween. The conductive pattern of each transmission line is preferably formed on the part mounting surface of the wiring board 1 on which the first communication unit 50 and second communication unit 60 are mounted.

The first-signal transmission line 11 is disposed in a path that interconnects the first antenna terminal T1 and first communication unit 50. The first signal S1 is transmitted through the first-signal transmission line 11.

A second-signal first transmission line 21 is disposed in a path that interconnects the second antenna terminal T2 and the second communication unit 60. In the two-antenna communication module, in which the second-signal antenna A2 is connected to the second antenna terminal T2, the second signal S2 can be transmitted through the second-signal first transmission line 21.

A second-signal second transmission line 22 is disposed in a path that interconnects the first antenna terminal T1 and the second communication unit 60. In the one-antenna communication module, in which the shared antenna A3 is connected to the first antenna terminal T1, the second signal S2 can be transmitted through the second-signal second transmission line 22.

A first common transmission line 30 is a common line disposed in both a path that interconnects the first antenna terminal T1 and the first-signal transmission line 11 and a path that interconnects the first antenna terminal T1 and the second-signal second transmission line 22. One end of the conductive pattern of the first common transmission line 30 is connected to the first antenna terminal T1. The other end of the first common transmission line 30 is connected to the first-signal transmission line 11 when the communication module is of the two-antenna type and to the first-signal transmission line 11 and second-signal second transmission line 22 through a duplexer 70 (see FIG. 2) when the communication module is of the one-antenna type.

A second common transmission line 20 is a common line disposed in both a path that interconnects the second-signal first transmission line 21 and the second communication unit 60 and a path that interconnects the second-signal second transmission line 22 and the second communication unit 60. One end of the conductive pattern of the second common transmission line 20 is connected to an input/output part in the second communication unit 60. The other end of the second common transmission line 20 is connected to a branch point P1 between the second-signal first transmission line 21 and second-signal second transmission line 22.

When the communication module is of the two-antenna type, in which the second antenna terminal T2 is open, the second-signal first transmission line 21 functions as an open stub that attenuates the first signal S1 transmitted from the branch point P1 between the second-signal first transmission line 21 and the second-signal second transmission line 22 to the second communication unit 60 through the second common transmission line 20.

For example, the second-signal first transmission line 21 preferably has a length equivalent to an odd-number multiple (value obtained by multiplying an odd number equal to or greater than 1) of one-fourth the wavelength λ of the first signal S1, which is a 2.4-GHz signal. In wireless LAN communication and Bluetooth (registered trademark) communication in the 2.4-GHz band, a frequency band from 2.4 GHz to 2.5 GHz is used. In consideration of the wavelength reduction rate of the circuit board (the waveform reduction rate of, for example, a flame retardant type 4 (FR4) circuit board is about 0.46), one-fourth the wavelength λ of a signal at 2.45-GHz signal, which is at the center of the frequency band, is 14.1 mm. Therefore, the impedance of the branch point P1 is minimized with respect to the first signal S1 having the wavelength λ, and the first signal S1 having the wavelength λ is attenuated. That is, a band stop filter for signals having the wavelength λ is formed by the open stub in the second-signal first transmission line 21. This makes it difficult for the first signal S1 to enter the second communication unit 60 from the branch point P1 through the second common transmission line 20. The stop bandwidth of a band stop filter formed by an open stub provided on a FR4 circuit board is within about five percent from the central frequency. Therefore, a 14.1-mm opens stub can attenuate signals at 2.4 GHz to 2.5 GHz. The stop bandwidth of a band stop filter formed by an open stub can be adjusted according to the material of the circuit board, the width of the open stub, the shape of the end of the open stub, and the like.

The first band pass filter 41, which is preferably disposed on the first-signal transmission line 11, preferably passes the first signal S1 transmitted from and received at the first communication unit 50 and attenuates signals (spurious signals) outside the frequency band of the first signal S1.

In addition to the common constituent elements described above (wiring board 1, first communication unit 50, second communication unit 60, and first band pass filter 41), the communication modules in this embodiment have type-specific constituent elements described below.

In the example in FIG. 1, the two-antenna communication module has a second band pass filter 42. The second band pass filter 42, which is disposed on the second common transmission line 20, passes the second signal S2 transmitted from and received at the second communication unit 60 and attenuates signals (spurious signals) outside the frequency band of the second signal S2.

In the example in FIG. 2, the one-antenna communication module preferably has a duplexer 70 disposed on a signal path between the first-signal transmission line 11 and the first common transmission line 30 and a signal path between the second-signal second transmission line 22 and the first common transmission line 30. The duplexer 70 outputs a signal transmitted from one of the first communication unit 50 and second communication unit 60 to the first antenna terminal T1 without allowing the signal to enter the other communication module. The duplexer 70 also outputs the first signal S1 received at the first antenna terminal T1 to the first communication unit 50 without allowing the signal to enter the second communication unit 60. Similarly, the duplexer 70 outputs the second signal S2 received at the first antenna terminal T1 to the second communication unit 60 without allowing the signal to enter the first communication unit 50.

Figure 3A:
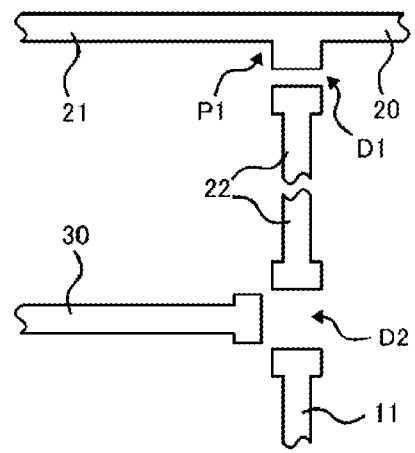
FIGS. 3A to 3C illustrate examples of states in which conductive patterns and a part or parts are mounted on a wiring board in the communication modules in the first embodiment, FIG. 3A illustrating the main part of the conductive patterns in a state in which no parts are mounted on the wiring board, FIG. 3B illustrating a state in which parts are mounted in a case in which a shared antenna is connected to the wiring board, FIG. 3C illustrating a state in which a part is mounted in a case in which two antennas are connected to the wiring board.
Figure 3B:
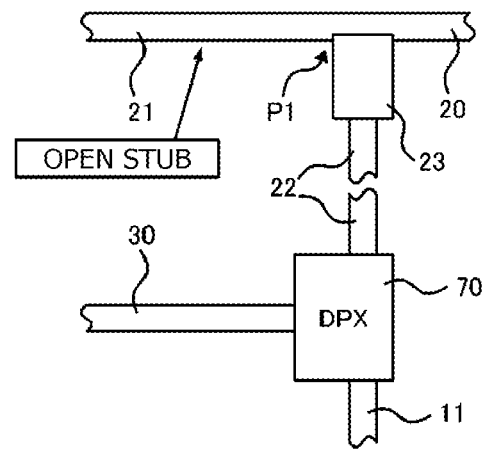
Figure 3C:
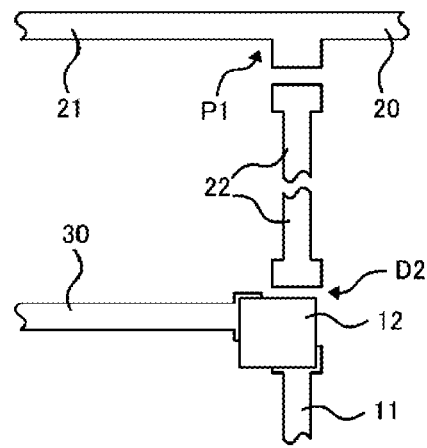

FIGS. 3A to 3C illustrate examples of states in which conductive patterns and a part or parts are mounted on the wiring board 1 in the communication modules in FIGS. 1 and 2. FIG. 3A illustrates the main part of the conductive patterns in a state in which no parts are mounted on the wiring board 1. FIG. 3B illustrates a state in which parts are mounted in the one-antenna communication module, in which the shared antenna A3 is connected to the wiring board 1. FIG. 3C illustrates a state in which a part is mounted in the two-antenna communication module, in which two antennas (A1 and A2) are connected to the wiring board 1.

In the example in FIG. 3A, the conductive patterns of the second-signal second transmission line 22 and second-signal first transmission line 21 are separated at a separation portion D1 close to the branch point P1. A land used to mount a part is formed on a surface of each of these transmission lines (21 and 22), the surface facing the separation portion D1. When the communication module is of the one-antenna type, a signal transmitting part 23 is mounted on the land facing the separation portion D1, as illustrated in FIG. 3B. The signal transmitting part 23 is a part that transmits the second signal S2 between the second-signal first transmission line 21 and the second-signal second transmission line 22. A surface-mounted part including a capacitor and a resistor, for example, is used as the signal transmitting part 23. When the communication module is of the two-antenna type, the signal transmitting part 23 is not mounted and the conductive pattern of the second-signal second transmission line 22 is separated from the second-signal first transmission line 21 in the vicinity of the branch point P1, as illustrated in FIG. 3C.

In the example in FIG. 3A, the conductive patterns of the first-signal transmission line 11, second-signal second transmission line 22, and first common transmission line 30 are separated from one another at a separation portion D2. A land used to mount a part is formed on a surface of each of these transmission lines (11, 22, and 30), the surface facing the separation portion D2. When the communication module is of the one-antenna type, the duplexer 70 is mounted at the separation portion D2, as illustrated in FIG. 3B. However, when the communication module is of the two-antenna type, the duplexer 70 is not mounted at the separation portion D2, but a signal transmitting part 12 is mounted instead, as illustrated in FIG. 3C. The signal transmitting part 12 transmits the first signal S1 between the conductive patterns of the first-signal transmission line 11 and first common transmission line 30. A surface-mounted part including a capacitor and a resistor, for example, is used as the signal transmitting part 12.

Both the two-antenna communication module and one-antenna communication module in this embodiment can perform 2.4-GHz wireless communication (wireless LAN communication or Bluetooth communication), which is carried out at the first communication unit 50, and 5-GHz wireless communication (wireless LAN communication), which is carried out at the second communication unit 60, at the same time. The two-antenna communication module (see FIG. 1) has an independent antenna for use in wireless communication for each frequency band, and also has a band pass filter (first band pass filter 41 or second band pass filter 42) on the signal path for each frequency band. This makes it difficult for a transmission signal in one frequency band to affect a reception operation in the other frequency band. By contrast, in the one-antenna communication module (see FIG. 2), a single shared antenna (A3) is used by two communication units (50 and 60), so it is necessary to prevent a transmission signal in one frequency band from entering the communication unit in the other frequency band.

The duplexer 70 is provided in the one-antenna communication module illustrated in FIG. 2. Therefore, to a certain extent, the filter operation of the duplexer 70 suppresses the first signal S1 from entering the second-signal second transmission line 22 from the first-signal transmission line 11 and also suppresses the second signal S2 from entering the first-signal transmission line 11 from the second-signal second transmission line 22. If, however, the level of the transmission signal becomes large relative to the level of the reception signal, the filter operation of the duplexer 70 may become insufficient. In view of this, the communication module illustrated in FIG. 2 attenuates the second signal S2 that enters the first communication unit 50 from the duplexer 70 by using the first band pass filter 41 and also attenuates the first signal S1 that enters the second communication unit 60 from the duplexer 70 by using the open stub formed on the second-signal second transmission line 22.

Figure 4:
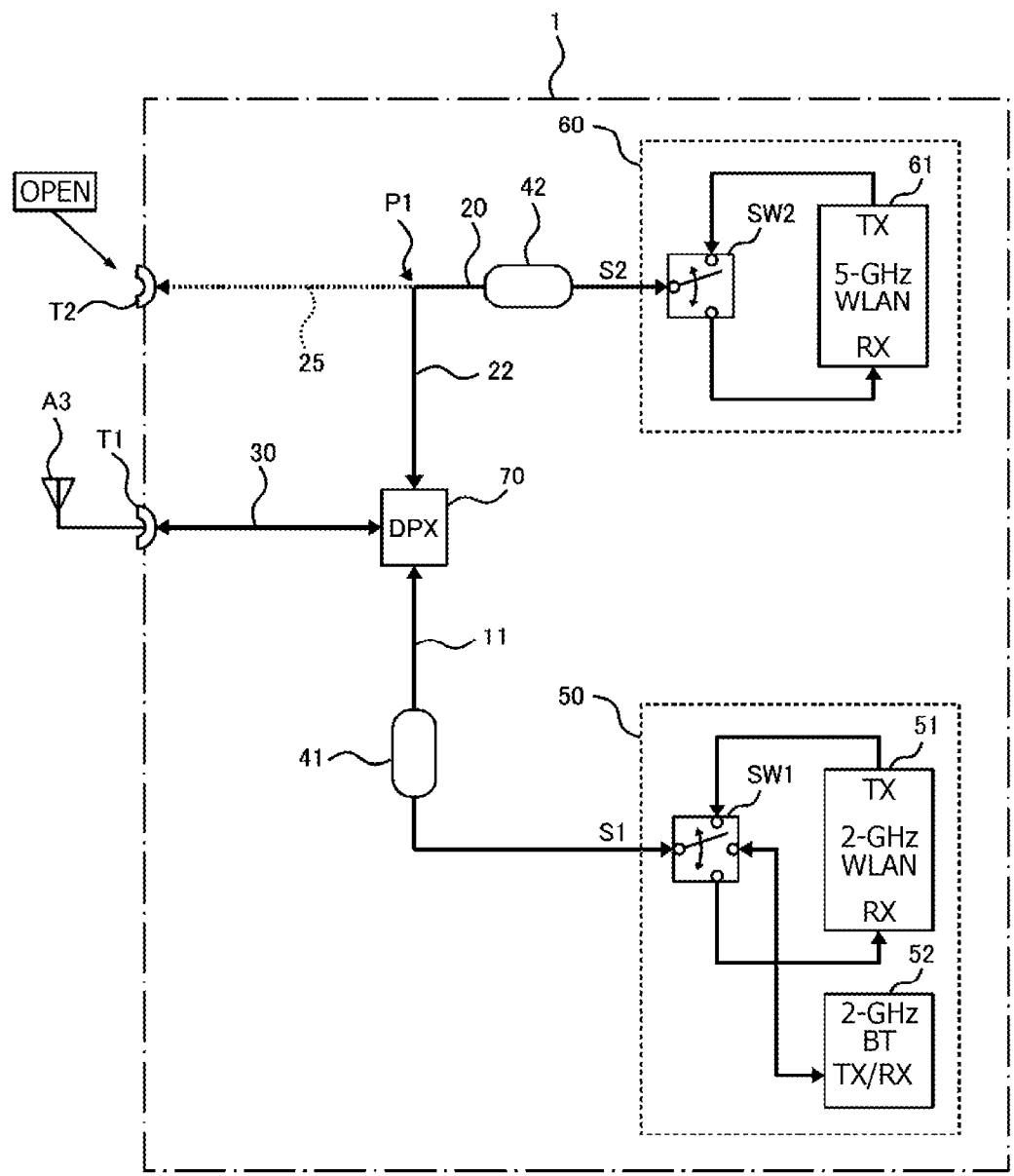
FIG. 4 illustrates a comparative example of a communication module that uses a common antenna in wireless communications in two frequency bands.

FIG. 4 illustrates a comparative example of the two-antenna communication module. In the comparative example in FIG. 4, the second-signal first transmission line 21 in the one-antenna communication module in FIG. 2 is replaced with a transmission line 25. The length of the transmission line 25 is not an odd-number multiple of one-fourth the wavelength λ of the first signal S1, so the transmission line 25 does not operate as a band stop filter that attenuates the first signal S1 having the wavelength λ. Therefore, the first signal S1 entering the second communication unit 60 from the duplexer 70 is not attenuated at the branch point P1. In the comparative example in FIG. 4, the second band pass filter 42 used in the two-antenna communication module needs to be inserted on the second common transmission line 20 to attenuate the first signal S1. That is, the communication module in the comparative example in FIG. 4 additionally needs the second band pass filter 42 when compared with the communication module in this embodiment in FIG. 2.

The communication modules in this embodiment described above provide effects below.

Since the second-signal first transmission line 21 operates as an open stub in a state in which the second antenna terminal T2 is open, the second-signal first transmission line 21 attenuates the first signal S1 transmitted from the branch point P1 between the second-signal first transmission line 21 and the second-signal second transmission line 22 to the second communication unit 60 through the second common transmission line 20. Therefore, in the two-antenna communication module, which performs communication of the first signal S1 and communication of the second signal S2 at the same time by connecting the shared antenna A3 to the first antenna terminal T1, a band pass filter and other elements can be omitted that would otherwise be used to attenuate the first signal S1 transmitted from the second-signal second transmission line 22 to the second communication unit 60. This enables wireless communications in different frequency bands to be performed at the same time with a reduced number of parts.

The second-signal first transmission line 21 functioning as an open stub in the one-antenna communication module doubles as a transmission line used for signal transmission between the branch point P1 and the second antenna terminal T2 as in the two-antenna communication module. Therefore, the wiring board 1 can be diverted to the two-antenna communication module structured so that communication of the first signal S1 and communication of the second signal S2 can be performed at the same time by connecting the first-signal antenna A1 to the first antenna terminal T1 and connecting the second-signal antenna A2 to the second antenna terminal T2. This enables parts to be shared between two types of communication modules (two-antenna communication module and one-antenna communication module), suppressing costs.

The second-signal first transmission line 21 has a length equal to an odd-number multiple of one-fourth the wavelength λ corresponding to the central frequency of the band used by the first signal S1. Therefore, the second-signal first transmission line 21 operates as an open stub that attenuates the first signal S1 having the wavelength λ. This can attenuate the first signal S1, having the wavelength λ, that is transmitted from the branch point P1 to the second communication unit 60 through the second common transmission line 20.

The conductive pattern of the second-signal first transmission line 21 is preferably formed on the part mounting surface, of the wiring board 1, on which the first communication unit 50 and second communication unit 60 are mounted. This increases the Q value of the band stop filter, on the second-signal first transmission line 21, that is an open stub in the one-antenna communication module. Accordingly, the first signal S1 having the wavelength λ can be efficiently attenuated.

The first antenna terminal T1 and second antenna terminal T2 are preferably structured by including an electrode (side-through electrode) provided at an end of the wiring board 1. This shortens signal paths, on the wiring board 1, between the antennas and the conductive patterns of the relevant transmission lines. Accordingly, losses in transmission and reception signals can be reduced.

In the one-antenna communication module, the duplexer 70 is preferably provided on a signal path between the first-signal transmission line 11 and the first common transmission line 30 and a signal path between the second-signal second transmission line 22 and the first common transmission line 30. This attenuates the first signal S1 transmitted from the first-signal transmission line 11 to the second-signal second transmission line 22, reducing the intensity of the first signal S1. Also, the second signal S2 is easily transmitted from the first common transmission line 30 to the second-signal second transmission line 22 in an efficient manner. This makes it difficult for the first signal S1 in the 2.4-GHz band to affect the reception operation of the second communication unit 60.

The first band pass filter 41, which passes the first signal S1, is preferably provided on the first-signal transmission line 11. Therefore, when the communication module is of the one-antenna type, the second signal S2 transmitted from the second-signal second transmission line 22 to the first communication unit 50 through the first-signal transmission line 11 is attenuated, reducing the intensity of the second signal S2. This reduces the effect of the second signal S2 on the reception operation of the first communication unit 50. Also, it becomes difficult for noise outside the frequency band of the first signal S1, the noise being generated in the first communication unit 50, to be transmitted to the second communication unit 60 through the first-signal transmission line 11 and second-signal second transmission line 22. This enables the second communication unit 60 to perform a more stable reception operation.

Second Embodiment

Next, a second embodiment of the present invention will be described. In the first embodiment described above, a transmission line used for signal transmission in the two-antenna communication module has functioned as an open stub in the one-antenna communication module. In the second embodiment, however, a transmission line used for signal transmission in the one-antenna communication module functions as an open stub in the two-antenna communication module.

Figure 5:
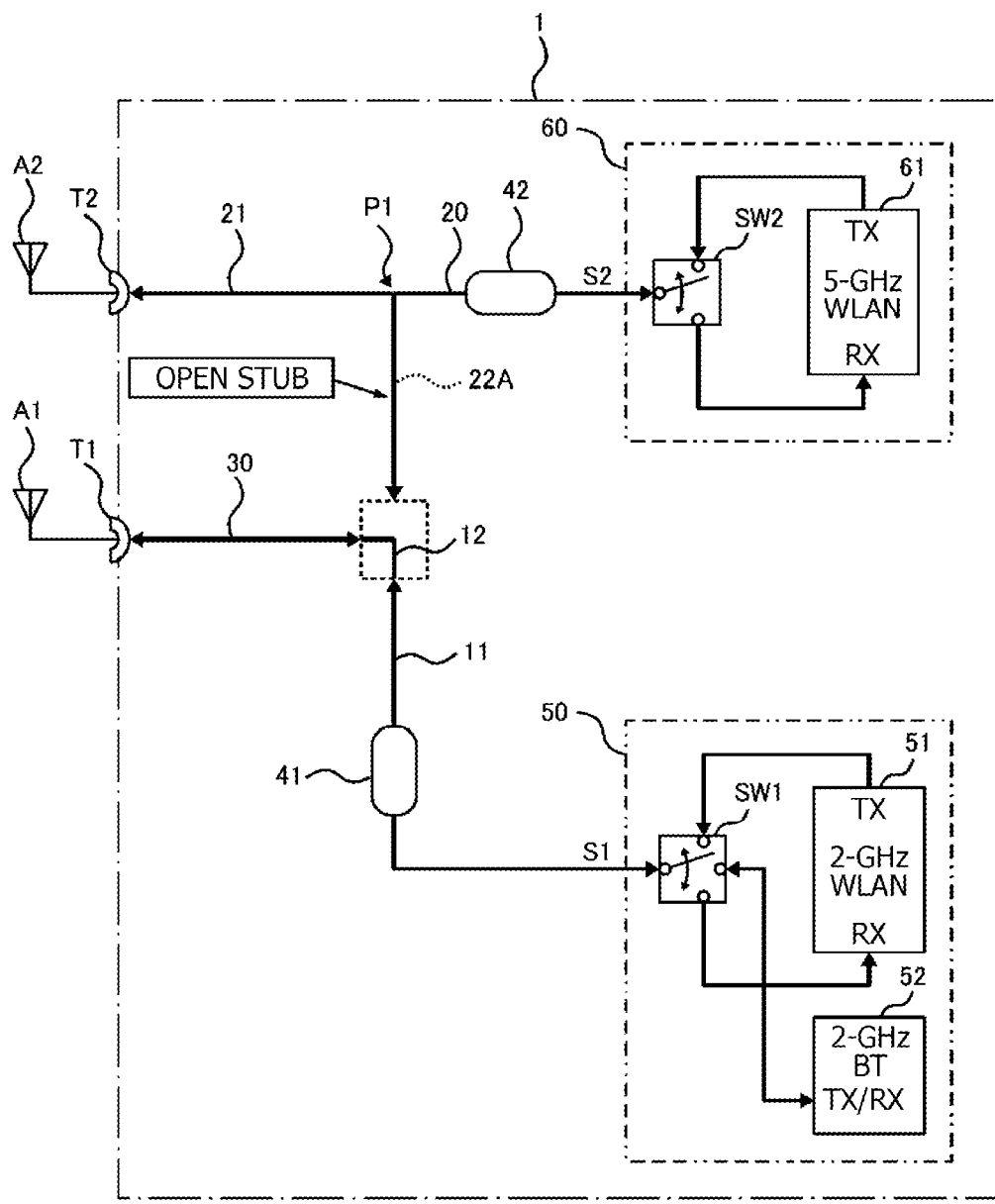
FIG. 5 illustrates an example of the structure of a communication module in a second embodiment, in which independent antennas are used in wireless communications in two frequency bands.

FIG. 5 illustrates an example of the structure of a two-antenna communication module in a second embodiment. In the communication module illustrated in FIG. 5, the second-signal second transmission line 22 in the communication module in FIG. 1 is replaced with a second-signal second transmission line 22A. Other elements are the same as in the communication module in FIG. 2. A one-antenna communication module in the second embodiment has the same structure as the communication module in FIG. 2, so the structure of the one-antenna communication module is not illustrated.

The second-signal second transmission line 22A in the one-antenna communication module is used to transmit the second signal S2 through the signal paths between the first antenna terminal T1 and the second communication unit 60 in the same way as the second-signal second transmission line 22 described above. However, the second-signal second transmission line 22A in the two-antenna communication module is separated from the first common transmission line 30 and first-signal transmission line 11. In this state, the second-signal second transmission line 22A functions as an open stub that attenuates the first signal S1 transmitted from the branch point P1 between the second-signal first transmission line 21 and the second-signal second transmission line 22A to the second communication unit 60 through the second common transmission line 20.

For example, the second-signal first transmission line 21 has a length equivalent to an odd-number multiple (value obtained by multiplying an odd number equal to or greater than 1) of one-fourth the wavelength $\lambda$ corresponding to the central frequency of the frequency band used by the first signal S1, which is a 2.4-GHz signal. Therefore, the impedance of the branch point P1 is minimized with respect to the first signal S1 having the wavelength $\lambda$, and the first signal S1 having the wavelength $\lambda$ is attenuated. That is, a band stop filter for signals having the wavelength $\lambda$ is formed by the open stub in the second-signal second transmission line 22A. This makes it difficult for the first signal S1 to enter the second communication unit 60 from the branch point P1 through the second common transmission line 20.

Figure 6A:
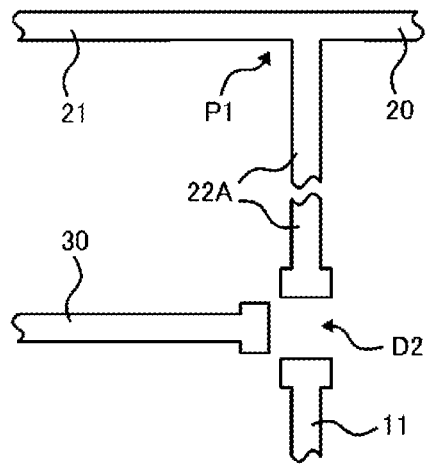
FIGS. 6A to 6C illustrate examples of states in which conductive patterns and a part is mounted on a wiring board of the communication module in the second embodiment, FIG. 6A illustrating the main part of the conductive patterns in a state in which no parts are mounted on the wiring board, FIG. 6B illustrating a state in which a part is mounted in a case in which a shared antenna is connected to the wiring board, FIG. 6C illustrating a state in which a part is mounted in a case in which two antennas are connected to the wiring board.
Figure 6B:
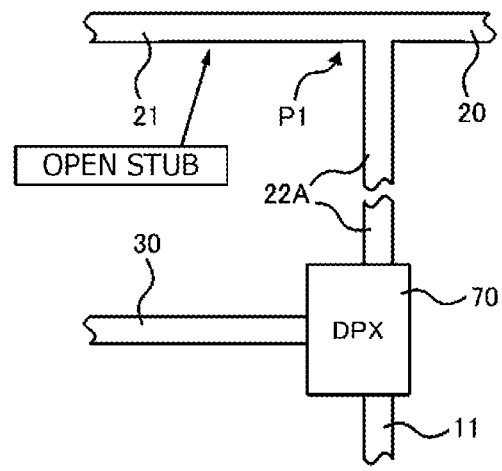
Figure 6C:
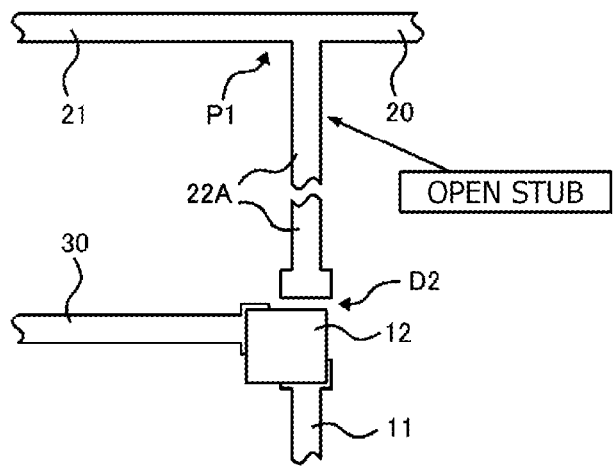

FIGS. 6A to 6C illustrate examples of states in which conductive patterns and a part is mounted on the wiring board 1 in the communication modules in the second embodiment. FIG. 6A illustrates the main part of the conductive patterns in a state in which no parts are mounted on the wiring board 1. FIG. 6B illustrates a state in which a part is mounted in the one-antenna communication module, in which the shared antenna A3 is connected to the wiring board 1. FIG. 6C illustrates a state in which a part is mounted in the two-antenna communication module, in which two antennas (A1 and A2) are connected to the wiring board 1.

As illustrated in FIG. 6A, one end of the conductive pattern of the second-signal second transmission line 22A is connected to the second common transmission line 20 and second-signal first transmission line 21 at the branch point P1, and is not separated as illustrated in FIG. 3A. However, when the communication module is of the two-antenna type, the other end of the conductive pattern of the second-signal second transmission line 22A is separated from the first-signal transmission line 11 and first common transmission line 30 at the separation portion D2, in which case the length of the second-signal second transmission line 22A from one end connected to the branch point P1 to the other end facing the separation portion D2 is an odd number multiple of $\lambda/4$.

In the two-antenna communication module structured as described above in this embodiment, when the second-signal second transmission line 22A is separated from the first common transmission line 30 and first-signal transmission line 11, the second-signal second transmission line 22A functions as an open stub. This attenuates the first signal S1 transmitted from the branch point P1 between the second-signal first transmission line 21 and the second-signal second transmission line 22A to the second communication unit 60 through the second common transmission line 20. Therefore, when the two-antenna communication module performs communication of the first signal S1 and communication of the second signal S2 at the same time, the first signal S1 transmitted from the first antenna terminal T1 to the second communication unit 60 can be further attenuated. This enables the second communication unit 60 to perform a more stable reception operation.

The second-signal second transmission line 22A functioning as an open stub in the two-antenna communication module in this embodiment doubles as a transmission line used for signal transmission between the branch point P1 and the first antenna terminal T1 as in the one-antenna communication module. Therefore, the wiring board 1 can be diverted to the one-antenna communication module structured so that communication of the first signal S1 and communication of the second signal S2 can be performed at the same time by connecting the shared antenna A3 to the first antenna terminal T1. This enables parts to be shared between two types of communication modules (two-antenna communication module and one-antenna communication module), suppressing costs.

The second-signal second transmission line 22A in the communication modules in this embodiment has a length equal to an odd-number multiple of one-fourth the wavelength λ of the first signal S1. Therefore, the second-signal second transmission line 22A operates as an open stub that attenuates the first signal S1 having the wavelength λ. This can attenuate the first signal S1, having the wavelength λ, that is transmitted from the branch point P1 to the second communication unit 60 through the second common transmission line 20.

The present invention is not limited to the embodiments described above but includes various variations.

Figure 7:
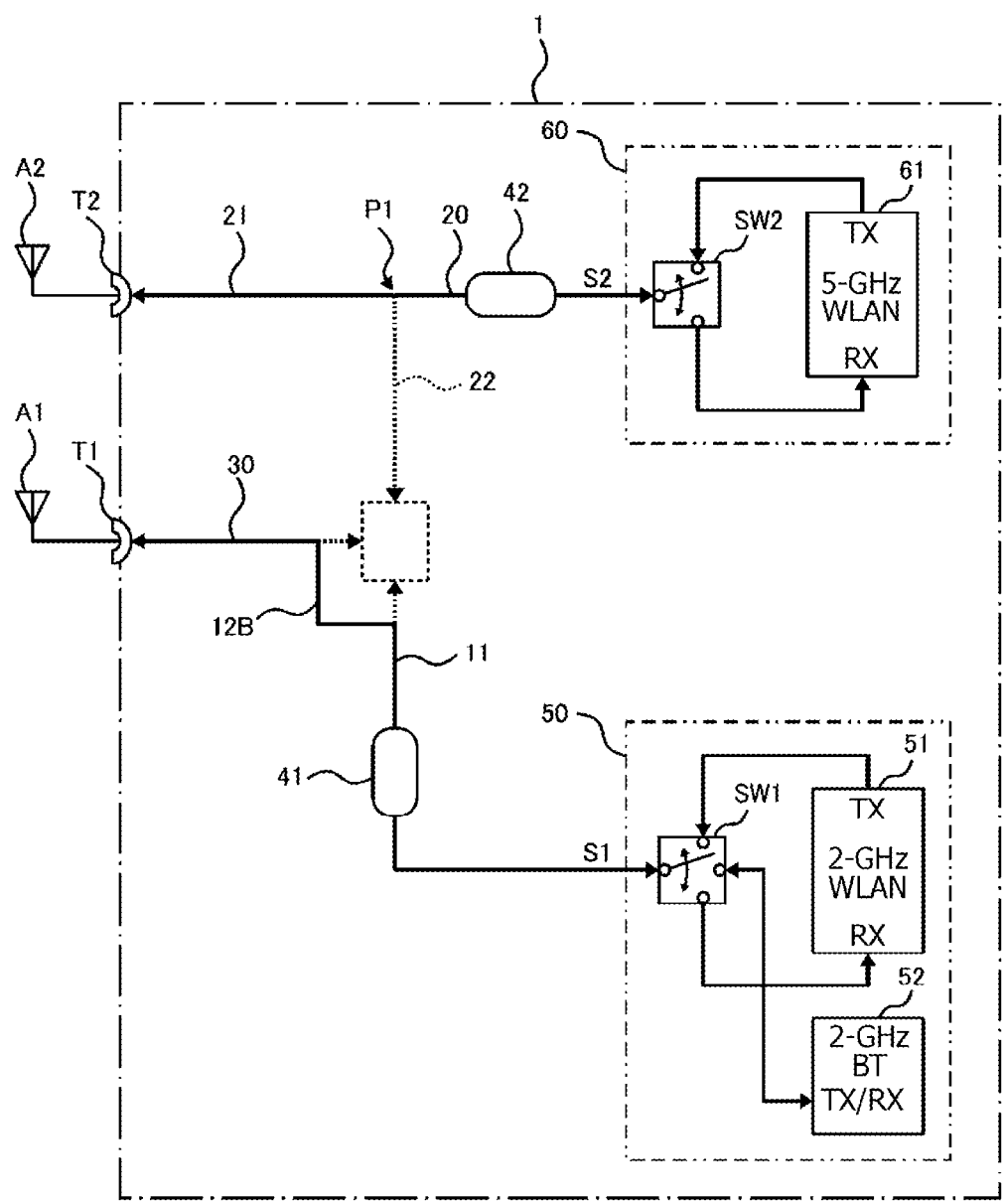
FIG. 7 illustrates, as a variation of the present invention, a communication module that uses independent antennas in wireless communications in two frequency bands.
Figure 8:
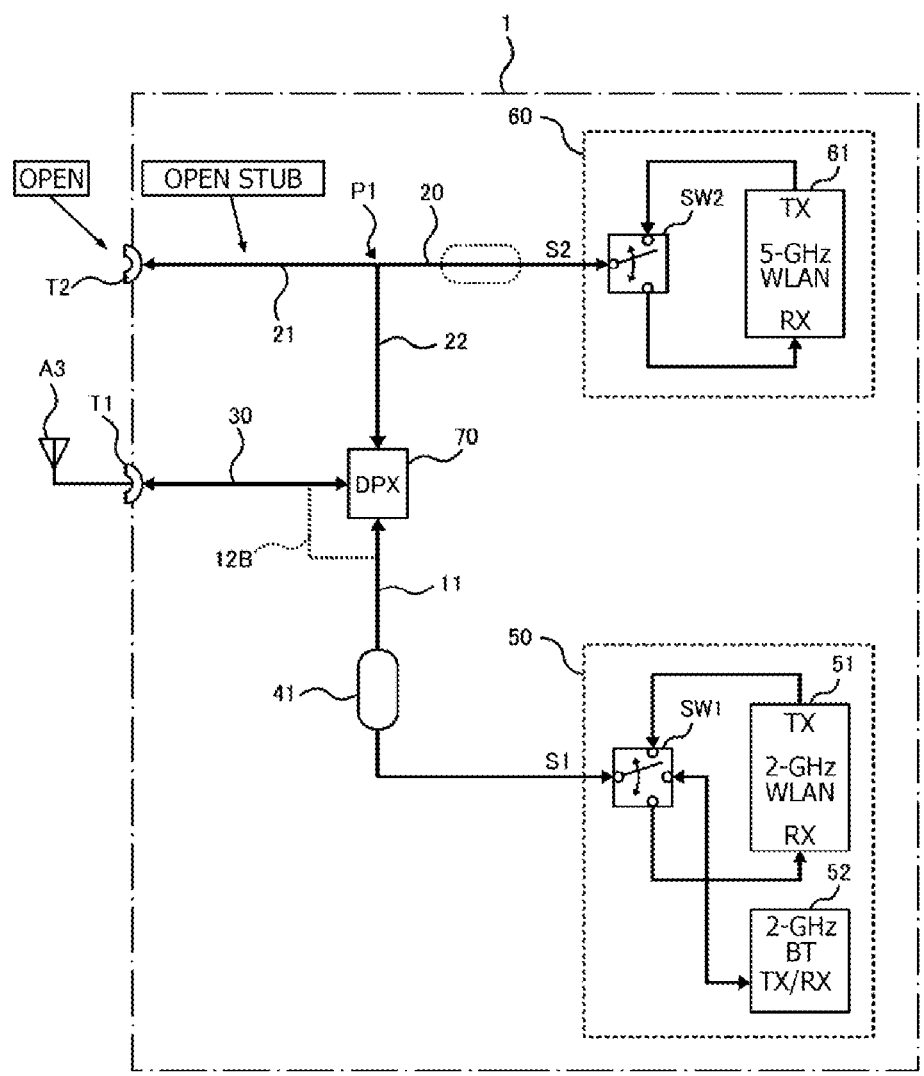
FIG. 8 illustrates, as another variation of the present invention, a communication module that uses a common antenna in wireless communications in two frequency bands.

In the two-antenna communication modules in the embodiments described above, a surface-mounted part that functions as the signal transmitting part 12 is mounted on lands on which the duplexer 70 would otherwise be mounted so as to interconnect one end of the first-signal transmission line 11 and one end of the first common transmission line 30. However, the present invention is not limited to this example. As illustrated in FIGS. 7 and 8, for example, a signal transmitting part 12B may be provided on a path different from the lands on which the duplexer 70 is mounted. In a two-antenna communication module (see FIG. 7), the first-signal transmission line 11 and first common transmission line 30 are interconnected on a signal path that includes the signal transmitting part 12B. In a one-antenna communication module (see FIG. 8), since the signal transmitting part 12B is not mounted, the signal path is shut down. Instead, a signal path established by the duplexer 70 takes effect. The signal transmitting part 12B may be a surface-mounted part similar to, for example, the signal transmitting part 12.

In the embodiments described above, connections of transmission lines are set so as to match the communication module type, depending on whether the signal transmitting part (12 or 23) implemented by a surface-mounted part or the like is mounted. However, this is not a limitation to the present invention. In another embodiment of the present invention, connections of transmission lines may be set, depending on whether conductive patterns are cut by, for example, laser machining.

What is claimed is:

1. A communication module that concurrently performs wireless communication of a first signal and wireless communication of a second signal, the first signal and second signal being in different frequency bands, the communication module comprising:
a wiring board that includes a first antenna terminal connectable to a first-signal antenna used in communication of the first signal or to a shared antenna used in both communication of the first signal and communication of the second signal, and a second antenna terminal connectable to a second-signal antenna used in communication of the second signal;
a first communication unit disposed on the wiring board, the first communication unit transmitting the first signal; and
a second communication unit disposed on the wiring board, the second communication unit receiving the second signal;
wherein
the wiring board includes:
a first-signal transmission line disposed in a path that interconnects the first antenna terminal and the first communication unit, the first signal being transmitted through the first signal transmission line,
a second-signal first transmission line disposed in a path that interconnects the second antenna terminal and the second communication unit, the second signal being capable of being transmitted through the second-signal first transmission line in a state in which the second-signal antenna is connected to the second antenna terminal,
a second-signal second transmission line disposed in a path that interconnects the first antenna terminal and the second communication unit, the second signal being transmitted through the second-signal second transmission line,
a first common transmission line provided so as to be shared between a path that interconnects the first antenna terminal and the first-signal transmission line and a path that interconnects the first antenna terminal and the second-signal second transmission line, and
a second common transmission line provided so as to be shared between a path that interconnects the second-signal first transmission line and the second communication unit and a path that interconnects the second-signal second transmission line and the second communication unit, and
the second-signal first transmission line functions as an open stub that attenuates the first signal transmitted from a branch point between the second-signal first transmission line and the second-signal second transmission line to the second communication unit through the second common transmission line in a state in which the second antenna terminal is open.

2. The communication module according to claim 1, wherein the second-signal first transmission line has a length equal to an odd-number multiple of one-fourth a wavelength of the first signal.

3. The communication module according to claim 2, wherein a conductive pattern of the second-signal first transmission line is formed on a part mounting surface of the wiring board, the first communication unit and second communication unit being mounted on the part mounting surface.

4. The communication module according to claim 3, wherein the second antenna terminal includes an electrode provided at an end of the wiring board.

5. The communication module according to claim 1, further comprising a duplexer disposed on a signal path between the first-signal transmission line and the first common transmission line and a signal path between the second-signal second transmission line and the first common transmission line, wherein:
the shared antenna is connected to the first antenna terminal, and
the second antenna terminal is made to be open.

6. The communication module according to claim 1, further comprising a band pass filter disposed on the first-signal transmission line, the band pass filter passing the first signal.

7. A communication module that concurrently performs wireless communication of a first signal and wireless communication of a second signal, the first signal and second signal being in different frequency bands, the communication module comprising:
a wiring board that includes a first antenna terminal connectable to a first-signal antenna used in communication of the first signal or to a shared antenna used in both communication of the first signal and communication of the second signal, and also includes a second antenna terminal connectable to a second-signal antenna used in communication of the second signal;

a first communication unit disposed on the wiring board, the first communication unit transmitting the first signal; and a second communication unit disposed on the wiring board, the second communication unit receiving the second signal;

wherein the wiring board includes:

a first-signal transmission line disposed in a path that interconnects the first antenna terminal and the first communication unit, the first signal being transmitted through the first signal transmission line, a second-signal first transmission line disposed in a path that interconnects the second antenna terminal and the second communication unit, the second signal being transmitted through the second-signal first transmission line, a second-signal second transmission line disposed in a path that interconnects the first antenna terminal and the second communication unit, the second signal being capable of being transmitted through the second-signal second transmission line in a state in which the shared antenna is connected to the first antenna terminal, a first common transmission line provided so as to be shared between a path that interconnects the first antenna terminal and the first-signal transmission line and a path that interconnects the first antenna terminal and the second-signal second transmission line, and a second common transmission line provided so as to be shared between a path that interconnects the second-signal first transmission line and the second communication unit and a path that interconnects the second-signal second transmission line and the second communication unit, and the second-signal second transmission line functions as an open stub that attenuates the first signal transmitted from a branch point between the second-signal first transmission line and the second-signal second transmission line to the second communication unit through the second common transmission line in a state in which the second-signal second transmission line is separated from the first common transmission line and first-signal transmission line.

8. The communication module according to claim 7, wherein the second-signal second transmission line has a length equal to an odd-number multiple of one-fourth a wavelength of the first signal in a state in which the second-signal second transmission line is separated from the first common transmission line and first-signal transmission line.

* * * * *